Aug. 19, 1924.

S. B. HASELTINE

FRICTION SHOCK ABSORBING MECHANISM

Filed Sept. 16, 1922   2 Sheets-Sheet 1

1,505,341

Witnesses
Wm. Geiger

Inventor
Stacy B. Haseltine
By Geo. I. Haight
His Atty

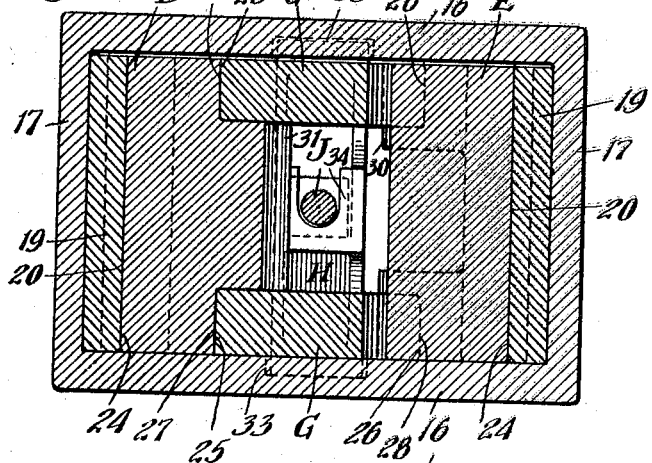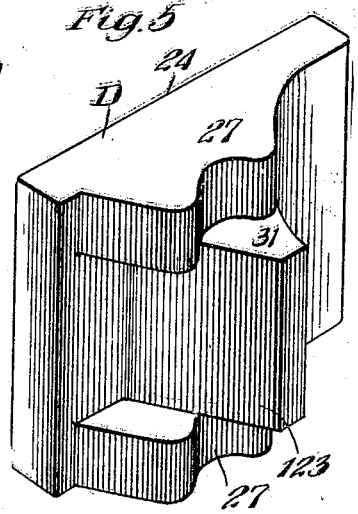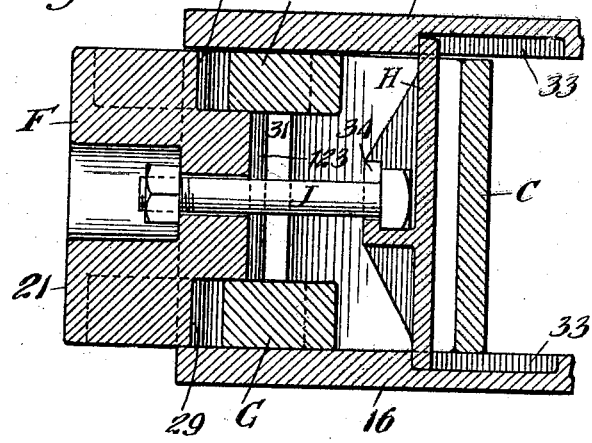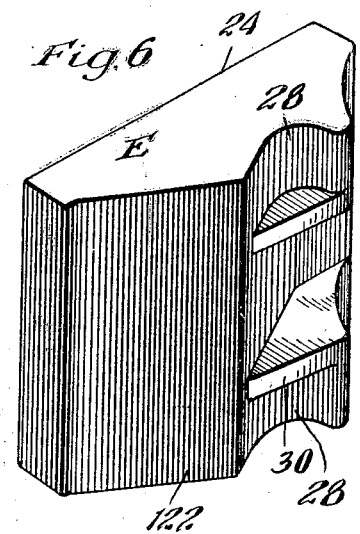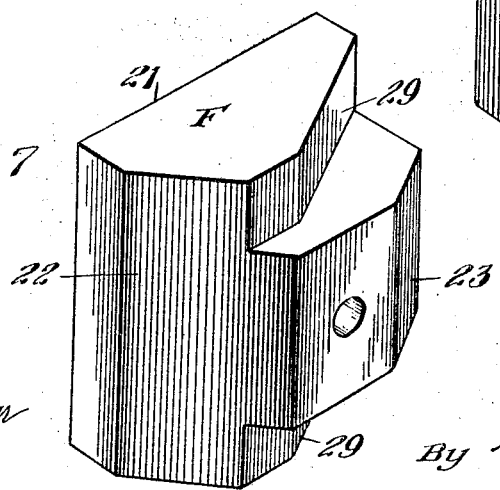

Patented Aug. 19, 1924.

1,505,341

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed September 16, 1922. Serial No. 588,522.

*To all whom it may concern:*

Be it known that I, STACY B. HASELTINE, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings and wherein are obtained high capacity and certain release and more specifically an arrangement wherein the high capacity is obtained by one set of wedge faces and the release insured by a different set of inclined faces.

More specifically an object of the invention is to provide, in a mechanism of the character above indicated, means, additional to the pressure-transmitting means, interposed between the shoes to augment the pressure and distribute the same transversely more efficiently throughout the length of the shoes.

Figure 1:
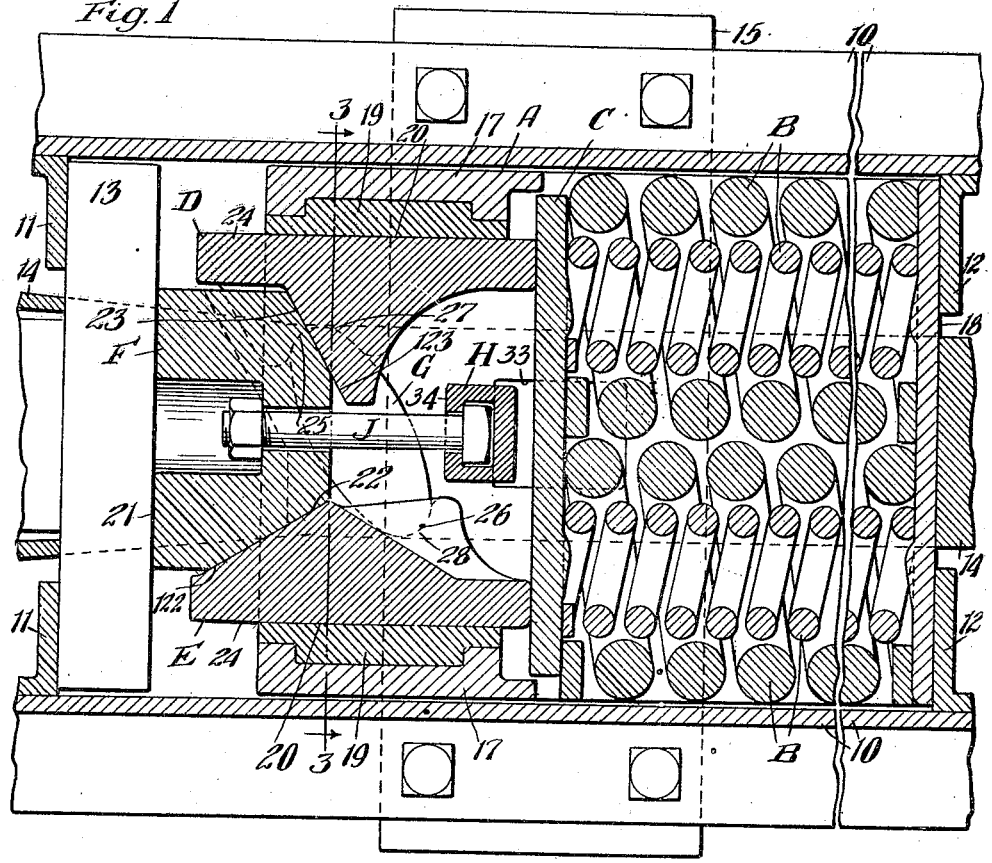
Figure 2:
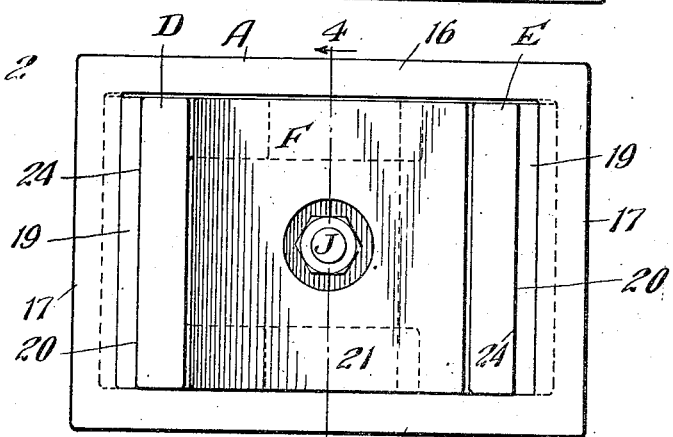

In the drawings forming a part of this specification, Figure 1 is a horizontal longitudinal sectional view of a portion of a railway draft rigging showing my improvements in connection therewith. Figure 2 is a front end elevation of the shock absorbing mechanism proper. Figure 3 is a vertical transverse sectional view of the shock absorbing mechanism proper corresponding to the line 3—3 of Figure 1. Figure 4 is a longitudinal vertical sectional view corresponding to the section line 4—4 of Figure 2. And Figures 5, 6 and 7 are detail perspectives of two of the friction shoes and the pressure-transmitting wedge, respectively.

In said drawings, 10—10 denote the usual channel draft sills of a car underframe to the inner faces of which are secured front stop lugs 16 and rear stop lugs 12. The shock absorbing mechanism proper, hereinafter described, and a front follower 13, are disposed within a hooded cast yoke 14 by which the mechanism is adapted to be operatively associated with the drawbar. The yoke and parts therewithin are supported in operative position by a detachable saddle plate 15.

The friction shock absorbing mechanism proper, as shown, comprises a combined friction shell and spring cage casting A, twin springs B—B; a spring follower C; two friction shoes D and E; a pressure-transmitting wedge F; a pair of toggle links G—G; an anchor bar H; and a retainer bolt J.

The casting A is of generally rectangular form having top and bottom walls 16—16, side walls 17—17 and rear integral wall 18, the latter cooperating with the stop lugs 12, in the manner of the usual rear follower. The side walls 17 are made comparatively short in order to leave the major portion of the sides of the casting A open and on their inner faces, the side walls 17 are provided with renewable hardened inserts 19—19, the latter having inner longitudinally extending friction surfaces 20.

The pressure-transmitting wedge is in the form of a casting and has a front transverse face 21 bearing on the front follower 13. At its inner end, said wedge F has opposed inclined faces 22 and 23, the former extending rearwardly and toward the axis of the mechanism at a relatively keen true wedge-acting angle with respect to forces applied parallel or substantially parallel to the center line of the mechanism. The face 23 is extended at a relatively blunt angle with respect to the axis and will be of a non-wedging character with respect to forces applied parallel to the axis of the mechanism and of such bluntness as to positively insure release or collapse of the friction unit upon discontinuance of the actuating force.

Each of the shoes D and E has an outer longitudinally extending flat friction surface 24 cooperable with the respective shell friction surface 20. On its inner side, the shoe D has an inclined face 123 engaging and cooperable with the face 23. Similarly, the shoe E has an inner inclined face 122 engaging and cooperating with the wedge face 22. The rear ends of the shoes D and E bear upon the spring follower C which is sufficiently extended laterally to provide a bearing for the twin springs B—B. The mechanism as thus far described, is similar to and operates in substantially the same manner as that shown and described in the prior pending application Serial No. 389,800 of John F. O'Connor, filed June 18, 1920, and assigned to William H. Miner.

The two links G, which are of like construction, are of elongated elliptical form having rounded ends 25 and 26, the former being seated in correspondingly concaved recesses 27—27 provided near the top and bottom of the shoe D. The rounded ends 26 of the links G are seated in correspondingly rounded recesses 28 formed near the top and bottom of the shoe E. It will be noted that the wedge F is suitably cut away near its top and bottom as indicated at 29—29 to allow clearance for the toggle links G which straddle the inwardly projecting end of the follower F. The bottom link G of the pair is supported on the bottom wall 16 of the casting A and the upper link is suitably supported by reason of the flange 30 of the shoe E and the horizontal shoulder 31 formed on the shoe D. It will be noted from an inspection of Figure 1 that the outermost portions of the links G bear on the blunt angle shoe D and that the inner ends of the links G bear upon the keen angle shoe E, for the purpose hereinafter described.

The anchor bar H extends vertically within the casting A and has its ends extending within elongated recesses 33—33 formed on the inner sides of the top and bottom walls 16 of the casting A, as best shown in Figure 4. On its forward side, the anchor bar H is provided with a slotted overhanging flange 34 behind which is engaged the head end of the retainer bolt J; the nut end thereof being anchored to the wedge F, as shown in Figures 1 and 4. The anchor bar H being limited in its forward movement with respect to the casting A, it is evident that the bolt J is similarly limited in its forward movement and hence that initial compression may be imposed upon the springs B by tightening down the nut on the bolt, the latter also serving to hold all of the parts in assembled position.

In operation, during a compression stroke, the true wedging action will be set up between the wedge F and the shoe E on the faces 22 and 122, the other set of inclined faces 23 and 123 being substantially inactive on account of their blunt angularity. Due to this arrangement of the two sets of inclined faces, there is a tendency of the shoe D to advance longitudinally ahead of the shoe E and I utilize this factor in operating the toggle links G, it being evident that, as the shoe D advances longitudinally relatively to the shoe E, the links G will tend to approach a more nearly transverse position and hence increase the spreading action against the shoes D and E. It will also be noted that this pressure is applied to the shoe E at a point relatively close to the inner end thereof, thus insuring substantially uniform pressure throughout the friction surface of the shoe E. It will further be noted that the links G operate as an auxiliary spreading means to positively insure the spreading action between the two shoes D and E. Upon removal of the actuating force, the wedge F is free to release itself from the shoe D on account of the blunt faces 23 and 123 and there is of course no interference with the collapse of the friction mechanism from the toggle links G since the latter are free to roll on their respective bearing surfaces.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a friction shell having opposed interior friction surfaces; of a spring resistance; opposed friction shoes cooperable with the shell; pressure-receiving and transmitting spreading means, said shoes and said means having a plurality of cooperating sets of faces, part of which are arranged at a relatively keen wedge-acting angle and others at a relatively blunt releasing angle; and auxiliary spreading means between and having direct engagement with said opposed friction shoes.

2. In a friction shock absorbing mechanism, the combination with a friction shell having opposed interior friction surfaces; of a spring resistance; opposed friction shoes cooperable with the shell; pressure-receiving and transmitting spreading means, said shoes and said means having a plurality of cooperating sets of faces, part of which are arranged at a relatively keen wedge-acting angle and others at a relatively blunt releasing angle; and auxiliary spreading means between and having direct engagement with said opposed friction shoes, said auxiliary spreading means including a toggle.

3. In a friction shock absorbing mechanism, the combination with a friction shell having opposed interior friction surfaces; of a spring resistance; opposed friction shoes cooperable with the shell; a single block pressure-receiving and transmitting spreader, said spreader and shoes having a plurality of cooperating sets of faces, part of which are arranged at a relatively keen wedge-acting angle and others at a relatively blunt releasing angle; and auxiliary spreading means between and having direct engagement with said opposed friction shoes.

4. In a friction shock absorbing mechanism, the combination with a friction shell having opposed interior friction surfaces; of a spring resistance; opposed friction shoes cooperable with the shell; a single block pressure-receiving and transmitting spreader, said spreader and shoes having a plurality of cooperating sets of faces, part of which are arranged at a relatively keen wedge-acting angle and others at a relatively blunt releasing angle; and auxiliary spreading means between and having direct engagement with said opposed friction shoes, said auxiliary spreading means including a toggle.

5. In a friction shock absorbing mechanism, the combination with a friction member provided with longitudinally extending friction surfaces; a spring resistance; friction elements having also longitudinally extending friction surfaces cooperable with the friction surfaces of said member, one element having a face inclined at a keen wedging angle relative to the axis of said member and another element having a face inclined at a relatively obtuse releasing angle relative to the axis of said member; a one-piece member having inclined faces co-acting directly with said inclined faces of said elements; and means co-acting directly with said friction elements operative, upon relative longitudinal shifting of said elements inwardly of the mechanism, to increase the pressure between said elements and said friction member.

6. In a friction shock absorbing mechanism, the combination with a shell; of a spring resistance; friction shoes slidable within said shell; and a movable wedge acting between the shoes, said shoes having inner faces inclined one to the other at an angle from within which the wedge is readily releasable upon discontinuance of the actuating compressing force, the inner face of one of said shoes being at an acute angle to create high frictional capacity in the mechanism and of such an acute angle per se that the initial collapse of the shoes and wedge must necessarily occur on other faces; and means co-acting directly with said friction elements operative, upon relative inward longitudinal shifting of said elements, to increase the pressure between said elements and said friction member.

7. In a friction shock absorbing mechanism, the combination with a shell; of a spring resistance; friction shoes slidable within said shell; and a movable wedge acting between the shoes, said shoes having inner faces inclined one to the other at an angle from within which the wedge is readily releasable upon discontinuance of the actuating compressing force, the inner face of one of said shoes being at an acute angle to create high frictional capacity in the mechanism and of such an acute angle per se that the initial collapse of the shoes and wedge must necessarily occur on other faces; and means co-acting directly with said friction elements operative, upon relative inward longitudinal shifting of said elements, to increase the pressure between said elements and said friction member, said means including a toggle.

8. In a friction shock absorbing mechanism, the combination with a friction shell having interior opposed friction surfaces; of a spring resistance; opposed friction shoes cooperable with the shell, one of said shoes having a face inclined inwardly of the shell at a relatively blunt angle to the axis and the other having a face inclined inwardly of the shell at a keen angle with respect to the axis; a pressure-transmitting spreader block having correspondingly inclined faces cooperable with said inclined faces on the shoes; and a toggle interposed between said two shoes.

9. In a friction shock absorbing mechanism, the combination with a friction shell having interior opposed friction surfaces; of a spring resistance; opposed friction shoes cooperable with the shell, one of said shoes having a face inclined inwardly of the shell at a relatively blunt angle to the axis and the other having a face inclined inwardly of the shell at a keen angle with respect to the axis; a pressure-transmitting spreader block having correspondingly inclined faces cooperable with said inclined faces of the shoes; and a toggle interposed between said two shoes, the outermost end of said toggle having bearing upon the blunt angle shoe and the innermost end of the toggle having bearing upon the keen angle shoe.

In witness that I claim the foregoing I have hereunto subscribed my name this 17th day of August 1922.

STACY B. HASELTINE.

Witnesses:
  UNA C. GRIGSBY,
  ANN BAKER.